No. 766,656. Patented August 2, 1904.

UNITED STATES PATENT OFFICE.

RALPH BAGGALEY, OF PITTSBURG, PENNSYLVANIA, AND CHARLES M. ALLEN, OF LOLO, MONTANA; SAID ALLEN ASSIGNOR TO SAID BAGGALEY.

METHOD OF PRODUCING MATTE.

SPECIFICATION forming part of Letters Patent No. 766,656, dated August 2, 1904.

Application filed March 22, 1904. Serial No. 199,421. (No specimens.)

*To all whom it may concern:*

Be it known that we, RALPH BAGGALEY, of Pittsburg, in the county of Allegheny and State of Pennsylvania, and CHARLES M. ALLEN, of Lolo, in the county of Missoula and State of Montana, have invented a Method of Producing Matte, of which the following is a description.

Our invention is an improvement upon the method of producing matte by dissolving ores for which we have already made application for Letters Patent Serial No. 198,593, filed March 17, 1904, wherein having obtained in a converter a molten bath composed of a low-grade matte high in fuel values, preferably made by melting sulfid ores, we blow air thereinto, then add silicious ore from time to time in small charges—that is to say, in charges which are less than the quantity of molten matte then in the converter—and replenish the bath from time to time with fresh additions of molten matte. The additions of ore are liquefied by the heat generated in the bath by the air-blast, the silica of the ore unites with the oxidized iron of the matte and produces a silicate of iron slag, which is drawn off from time to time, and the values of the ore are liquefied and dissolve in the molten bath. The slag is frequently removed to expose the surface of the bath and to cause it to act immediately and quickly upon the ore additions.

The speed at which this process can be conducted will depend to a large extent upon the amount of heat which is developed, and we propose by this invention to supplement the heat which is generated by the chemical combination of the oxygen of the blast with the fuel constituents of the bath—namely, the sulfur, iron, and other oxidizable elements—by heat which is applied to the ore before it is charged into the converter. For this purpose we heat the ore which is to be used to make the additions preferably by exposing it to the heat of the waste gases as they come from the furnace or converter, and we deliver the hot ore to the bath in small quantities at a time by means of a charging-machine, so as to effect a regular and uniform supply.

With a given investment in a plant the daily product may be increased to an important percentage by practicing the art disclosed in our present invention.

Ores are normally at the temperature of the ground or the atmosphere, which in summer may be 80° or 90° Fahrenheit and in winter may be 30° below zero. By our invention the moisture is expelled and the temperature may be raised to 600° to 1,200° Fahrenheit. This, in effect, is equivalent to adding just a corresponding number of degrees to the molten bath in its mission of dissolving fresh ore charges with a proportionate increase in the tonnage that it is possible to treat daily in a given plant and which may easily amount to an increase of tonnage of twenty per cent.

The invention may be modified in many ways and may be practiced either in a tipping converter or in a stationary converter, since

What we claim is—

1. The method herein described of producing matte or copper, which consists in forming a molten bath of matte, blowing air thereinto, adding from time to time relatively small quantities of metal-bearing ore high in silica, fluxing thereby the iron of the bath, replenishing the bath with material high in fuel values, and heating the additions of ore before they are delivered to the bath; substantially as described.

2. The method herein described of producing matte or copper, which consists in forming a molten bath of matte, blowing air thereinto, adding from time to time relatively small quantities of metal-bearing ore high in silica, fluxing thereby the iron of the bath, replenishing the bath with molten materal high in fuel value, and heating the additions of ore before they are delivered to the bath; substantially as described.

In testimony whereof we have hereunto set our hands March 17, 1904.

RALPH BAGGALEY.
CHARLES M. ALLEN.

Witnesses:
THOMAS W. BAKEWELL,
MALCOLM L. MACDONALD.